United States Patent
Marinier et al.

(10) Patent No.: US 9,516,657 B2
(45) Date of Patent: Dec. 6, 2016

(54) CONTROLLING INTER-CELL INTERFERENCE IN FORWARD ACCESS CHANNEL (CELL_FACH) STATE

(75) Inventors: Paul Marinier, Montreal (CA); Diana Pani, Montreal (CA); Christopher Cave, Montreal (CA)

(73) Assignee: InterDigital Patent Holdings, Inc., Wilmington, DE (US)

(*) Notice: Subject to any disclaimer, the term of this patent is extended or adjusted under 35 U.S.C. 154(b) by 1007 days.

(21) Appl. No.: 13/436,830

(22) Filed: Mar. 30, 2012

(65) Prior Publication Data

US 2012/0250521 A1    Oct. 4, 2012

Related U.S. Application Data

(60) Provisional application No. 61/470,703, filed on Apr. 1, 2011.

(51) Int. Cl.
*H04W 72/08* (2009.01)
*H04W 28/04* (2009.01)

(52) U.S. Cl.
CPC ......... *H04W 72/082* (2013.01); *H04W 28/048* (2013.01)

(58) Field of Classification Search
CPC .................................................. H04W 72/082
See application file for complete search history.

(56) References Cited

U.S. PATENT DOCUMENTS

| | | | |
|---|---|---|---|
| 2006/0176856 A1 | 8/2006 | Yang et al. | |
| 2006/0268773 A1 | 11/2006 | Ranta-Aho et al. | |
| 2006/0268776 A1 | 11/2006 | Ko et al. | |
| 2008/0059859 A1* | 3/2008 | Marinier et al. | 714/748 |
| 2008/0214197 A1 | 9/2008 | Englund et al. | |
| 2009/0086671 A1 | 4/2009 | Pelletier et al. | |
| 2009/0086861 A1* | 4/2009 | Yavuz et al. | 375/346 |
| 2009/0109912 A1 | 4/2009 | Di Girolamo et al. | |

(Continued)

FOREIGN PATENT DOCUMENTS

| | | |
|---|---|---|
| CN | 101193421 A | 6/2008 |
| CN | 101616488 A | 12/2009 |
| CN | 101953219 A | 1/2011 |

OTHER PUBLICATIONS

3rd Generation Partnership Project (3GPP), R2-110890, "Introducing Further Enhancements to Cell_FACH Operation", Qualcomm Incorporated, 3GPP TSG-RAN2#73, Taipei, Taiwan, Feb. 21-25, 2011, 31 pages.

(Continued)

*Primary Examiner* — Dang Ton
*Assistant Examiner* — Nourali Mansoury
(74) *Attorney, Agent, or Firm* — Condo Roccia Koptiw LLP (57) ABSTRACT

Since common E-DCH resources may be assigned from a single Node B, uplink macro-diversity may not be possible between neighboring Node B's. In addition, a user equipment (UE) assigned a common E-DCH resource may not be allowed to perform cell reselection. Thus, maintaining the assignment of a common E-DCH resource to a given UE for more than a few hundred milliseconds may result in unacceptable inter-cell interference, for example, when the UE moves closer to a neighboring cell controlled by a non-serving Node B. To overcome inter-cell interference and allow a more extensive utilization of the Cell_FACH state, a method may be used to detect and/or control inter-cell interference.

8 Claims, 7 Drawing Sheets

(56) References Cited

U.S. PATENT DOCUMENTS

| | | | |
|---|---|---|---|
| 2010/0157895 A1* | 6/2010 | Pani et al. | 370/328 |
| 2010/0177721 A1 | 7/2010 | Simonsson et al. | |
| 2010/0265964 A1* | 10/2010 | Lindskog et al. | 370/431 |
| 2010/0273520 A1* | 10/2010 | Pelletier et al. | 455/522 |
| 2010/0303030 A1* | 12/2010 | Andersson | 370/329 |
| 2011/0014917 A1* | 1/2011 | Wager | H04W 36/0061 455/438 |
| 2012/0008563 A1* | 1/2012 | Johansson et al. | 370/328 |
| 2012/0190367 A1* | 7/2012 | Nakamori | H04W 36/0083 455/436 |
| 2013/0034006 A1* | 2/2013 | Ishii | H04W 24/10 370/252 |
| 2013/0035101 A1* | 2/2013 | Wang | H04W 36/08 455/437 |

OTHER PUBLICATIONS

3rd Generation Partnership Project, RP-110436, "Further enhancements to Cell_FACH", Ericsson, ST-Ericsson, Qualcomm Incorporated, 3GPP TSG-RAN Meeting #51, Kansas City, Kansas, USA, Mar. 15-18, 2011, 4 pages.

3rd Generation Partnership Project, TS 25.214 V10.1.0, "3rd Generation Partnership Project; Technical Specification Group Radio Access Network; Physical layer procedures (FDD) (Release 10)", Dec. 2010, 99 pages.

3rd Generation Partnership Project, TS 25.321 V10.1.0, "3rd Generation Partnership Project; Technical Specification Group Radio Access Network; Medium Access Control (MAC) protocol specification (Release 10)", Dec. 2010, 198 pages.

$3^{rd}$ Generation Partnership Project (3GPP), R2-114347, "Uplink Interference Avoidance and Control in CELL_FACH", Renesas Mobile Europe Ltd., 3GPP TSG-RAN WG2 Meeting #75, Athen, Greece, Aug. 22-26, 2011, 5 pages.

$3^{rd}$ Generation Partnership Project (3GPP), R1-120788, "State transition to CELL_DCH for Uplink Interference Control and Avoidance", Renesas Mobile Europe Ltd., 3GPP TSG-RAN WG1 Meeting #68, Dresden, Germany, Feb. 5-10, 2012, 4 pages.

$3^{rd}$ Generation Partnership Project (3GPP), R1-113164, "Uplink Interference Control in CELL_FACH", Renesas Mobile Europe Ltd., 3GPP TSG-RAN WG1 Meeting #66bis, Zhuhai, China, Oct. 10-14, 2011, 8 pages.

$3^{rd}$ Generation Partnership Project (3GPP), R2-121814, "Discussion on standalone per-HARQ grant processing", Huawei, HiSilicon, 3GPP TSG-RAN WG2 #77bis, Jeju Island, Korea, Mar. 26-30, 2012, 2 pages.

$3^{rd}$ Generation Partnership Project (3GPP), R2-115273, "Per-HARQ-process grants for 2ms TTI", Ericsson, ST-Ericsson, 3GPP TSG-RAN WG2 Meeting #75bis, Zhuha, R.R.C., Oct. 9-13, 2011, 5 pages.

$3^{rd}$ Generation Partnership Project (3GPP), R2-113324, "Per-HARQ-process activation for 2ms TTI", Ericsson, ST-Ericsson, 3GPP TSG-RAN WG2 Meeting #74, Barcelona, Spain, May 9-13, 2011, 2 pages.

Ericsson, TSGR2-99419, "UE Measurement Concept for Intra-Frequency Measurements", Ericsson, TSG_RAN Working Group 2 (Radio layer 2 and Radio layer 3), TSGR#24(99)419, Berlin, Germany, May 25-28, 1999, 11 pages.

Ericsson, TSGR2-99250, "UE Measurement Concept for Intra-Frequency Measurements", Ericsson, TSG_RAN Working Group 2 (Radio layer 2 and Radio layer 3), TSGR#3(99)250, Yokohama, Japan, Apr. 13-16, 1999, 9 pages.

Ericsson, TSGR2-99144, "UE Measurement Concept for Intra-Frequency Measurements", Ericsson,TSG_RAN Working Group 2 (Radio layer 2 and Radio layer 3), TSGR2#2(99)144, Stockholm, Sweden, Mar. 8-11, 1999, 9 pages.

$3^{rd}$ Generation Partnership Project (3GPP), R2-012212, "Intra-frequency measurement corrections", TSG-RAN WG2., 3GPP TSG-RAN WG2 Meeting #23, Helsinki, Finland, Aug. 27-31, 2001, 28 pages.

* cited by examiner

CONTROLLING INTER-CELL INTERFERENCE IN FORWARD ACCESS CHANNEL (CELL_FACH) STATE

CROSS REFERENCE TO RELATED APPLICATIONS

This application claims the benefit of U.S. Provisional Application No. 61/470,703, filed Apr. 1, 2011, which is incorporated by reference as if fully set forth herein.

BACKGROUND

Mobile network have been experiencing a continuous increase in data traffic, which is characterized by high levels of bursts and small packet sizes.

In HSPA systems, the Cell_FACH state is best suited to serving user equipment (UE) that is experiencing low activity. The Cell_FACH state has been improved in previous releases to allow the utilization of enhanced data channels in the downlink and uplink (HS-DSCH and E-DCH respectively). However, extensive utilization of the Cell_FACH state may create inter-cell interference.

SUMMARY

Disclosed herein are systems and methods for controlling inter-cell interference in forward access channel (cell_FACH) state. This may be done, for example, to overcome inter-cell interference and allow a more extensive utilization of the Cell_FACH state. Since common E-DCH resources may be assigned from a single Node B, uplink macro-diversity may not be possible between neighboring Node B's. In addition, a UE assigned a common E-DCH resource may not be allowed to perform cell reselection. Thus, maintaining the assignment of a common E-DCH resource to a given UE for more than a few hundred milliseconds may not be practical as it may result in unacceptable inter-cell interference, for example, if the UE moves closer to a neighboring cell controlled by a non-serving Node B. In some cases, the network may have to transition the UE to the Cell_DCH state or may have to release the common E-DCH resource a few hundred milliseconds after assigning a common E-DCH resource. Either alternative may not be ideal for a UE experiencing low level of activity for extended periods. Accordingly, the embodiments disclosed herein may allow the UE to keep its common E-DCH resource for a larger period and may minimize inter-cell interference.

According to an aspect, a method may be used for detecting inter-cell interference when a UE is in a non-DCH state. A set of characteristics for an interference indication applicable to a common enhanced dedicated channel (E-DCH) resource may be obtained. An interference indication may be determined from a relative grant channel (E-RGCH) using the characteristics of the interference indication. A threshold to apply the interference indication may be determined. An interference indication may be applied when the threshold is met or exceeded.

According to an aspect, a method may be used to control inter-cell interference when a UE is in a non-dedicated channel (DCH) state. It may be determined that inter-cell interference may be affecting a victim cell from a relative grant channel (E-RGCH) using a set of characteristics. A threshold that indicates when to control the inter-cell interference may be determined. Inter-cell interference may be controlled when the threshold is met or exceeded.

According to an aspect, a wireless transmit/receive unit (WTRU) may detect and control inter-cell interference when the WTRU is in a non-DCH state. The WTRU may have a receiver configured to receive a set of characteristics for an interference indication applicable to a common enhanced dedicated cannel (E-DCH) resource. The WTRU may have a processor configured to determine an interference indication from a relative grant channel (E-RGCH) using the characteristics of the interference indication. The processor may also determine a threshold to apply the interference indication and apply the interference indication when the threshold is met or exceeded.

According to an aspect, a method may be implemented at a user equipment (UE). The method may include determining whether an interference-indication signal received from one of a serving cell and a neighbor cell is above a threshold. The method may also include stopping transmission of an E-DCH dedicated physical data control channel (E-DPDCH) in response to determining that the signal is above the threshold.

According to an aspect, a method may be implemented at a UE. The method may include determining whether an interference-indication signal received from one of a serving cell and a neighbor cell is above a threshold. The method may also include deactivating a hybrid automatic repeat request (HARD) process in response to determining that the signal is above the threshold.

According to an aspect, a method may be implemented at a UE. The method may include determining whether an interference-indication signal received from one of a serving cell and a neighbor cell is above a threshold. The method may also include reducing an E-DPDCH power in response to determining that the signal is above the threshold.

The Summary is provided to introduce a selection of concepts in a simplified form that are further described below in the Detailed Description. This Summary is not intended to identify key features or essential features of the claimed subject matter, not is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

A more detailed understanding may be had from the following description, given by way of example in conjunction with the accompanying drawings.

DETAILED DESCRIPTION

Disclosed herein are systems and methods for controlling inter-cell interference in forward access channel (cell_FACH) state. This may be done, for example, to overcome inter-cell interference and allow a more extensive utilization of the Cell_FACH state. Since common E-DCH resources may be assigned from a single Node B, uplink macro-diversity may not be possible between neighboring Node B's. In addition, a UE assigned a common E-DCH resource may not be allowed to perform cell reselection. Thus, maintaining the assignment of a common E-DCH resource to a given UE for more than a few hundred milliseconds may not be practical as it may result in unacceptable inter-cell interference, for example, if the UE moves closer to a neighboring cell controlled by a non-serving Node B. In some cases, the network may have to transition the UE to the Cell_DCH state or may have to release the common E-DCH resource a few hundred milliseconds after assigning a common E-DCH resource. Either alternative may not ideal for a UE experiencing low level of activity for extended periods. Accordingly, the embodiments disclosed herein may allow the UE to keep its common E-DCH resource for a larger period and may minimize inter-cell interference.

The term "non-DCH states" may be used herein to describe any state where the UE may not be fully connected to the radio access network (RAN). For example, the UE may not have a set of dedicated resources for DL reception and UL transmission).

For Universal Mobile Telecommunications System (UMTS), the term "non-DCH states" may refer to any of the following states: IDLE mode; URA_PCH state; CELL_PCH state; and CELL_FACH state.

The terms "E-DCH in CELL_FACH State," "E-DCH in non-DCH state," "Common E-DCH" or "Enhanced RACH" may be used to designate the contention-based E-DCH channel or contention-free dedicated channels that may be used in non-DCH states.

System and method embodiments in accordance with the present disclosure may allow a UE to detect an actual or potential inter-cell interference situation, and/or may allow a UE to remediate to, or prevent, the inter-cell interference situation, upon detection of such situation using any of the techniques described herein. These embodiments are described in further detail herein.

The techniques described herein in the context of a common E-DCH resource may also be applicable in other scenarios such as where no E-DCH transmissions are being performed and the UE may be operating with a stand-alone HS-DPCCH. These techniques may be applicable to a scenario where the UE may have a common E-DCH resource allocated for the purpose of HS-DPCCH transmission, for example, where the allocation may be without E-DCH data. These techniques may also be applicable to a scenario where the UE may have a common resource allocated without any E-DCH channels, which may be for transmitting HS-DPCCH. In these situations, the UE may be generating interference in the UL due to control channels.

When referred to hereafter, a common E-DCH resource may refer to a common set of dedicated resources that may be shared by UEs in non-CELL_DCH state. This may include a set of resources that may be used to perform E-DCH transmissions. For example, the set of resources may include E-DCH specific channels (data and control) and dedicated control channels, such as DPCCH, F-DPCH, HS-DPCCH, or the like. As another example, the set of resources may include resources to perform HS-DPCCH feedback optionally including DPCCH and F-DPCH to perform power control loop operations.

Figure 1A:
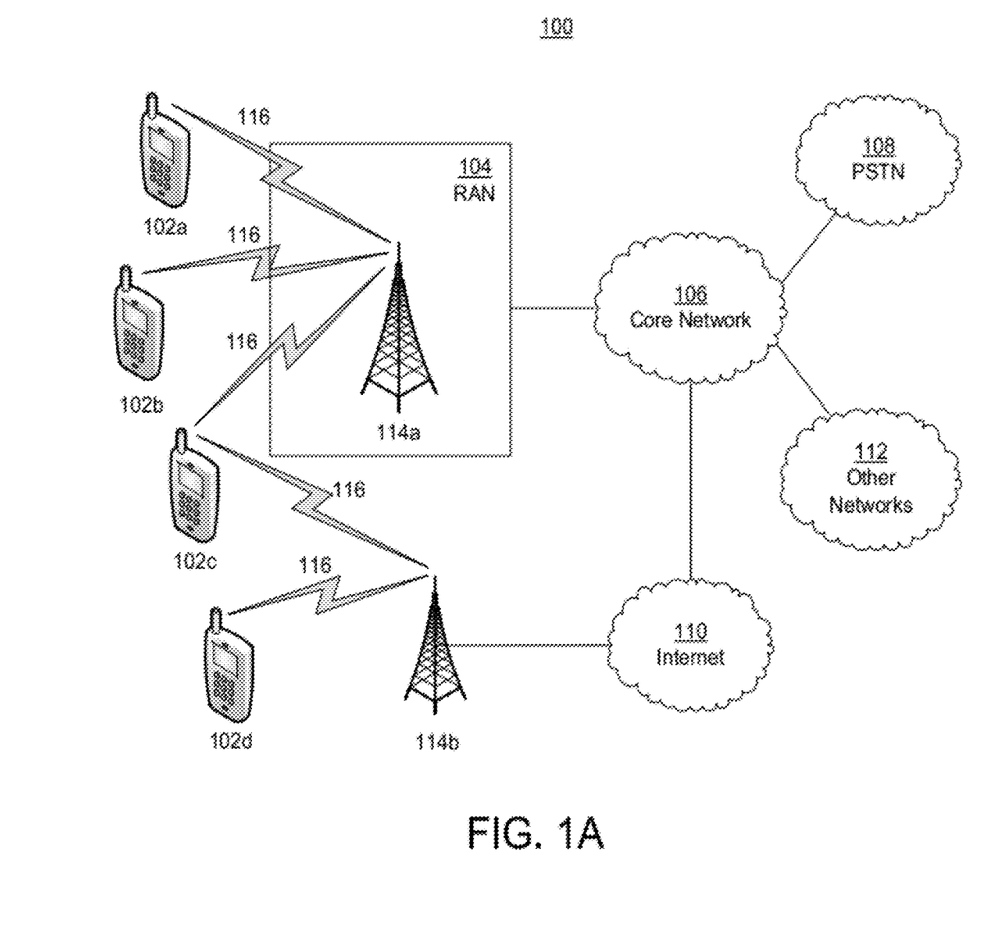
FIG. 1A depicts a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
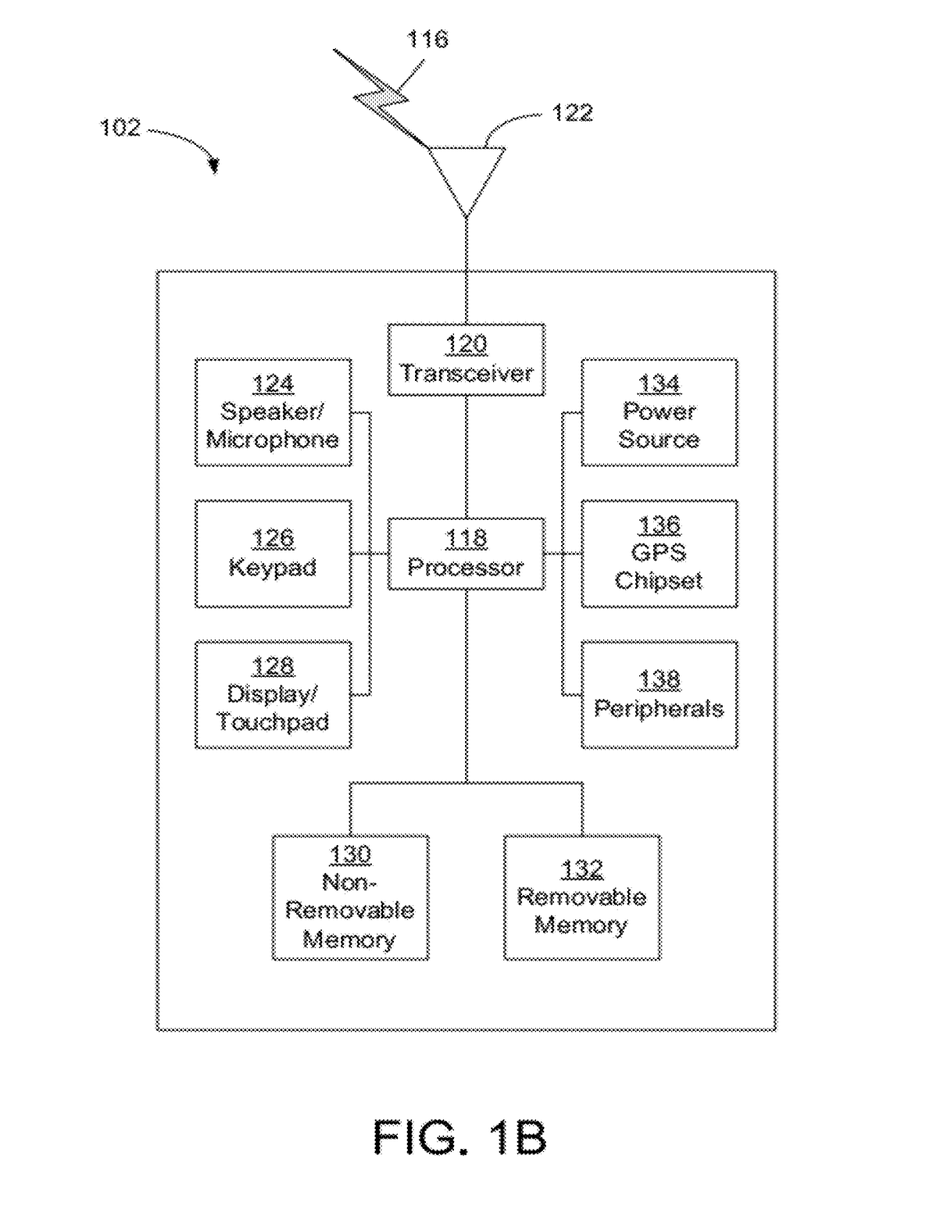
FIG. 1B depicts a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
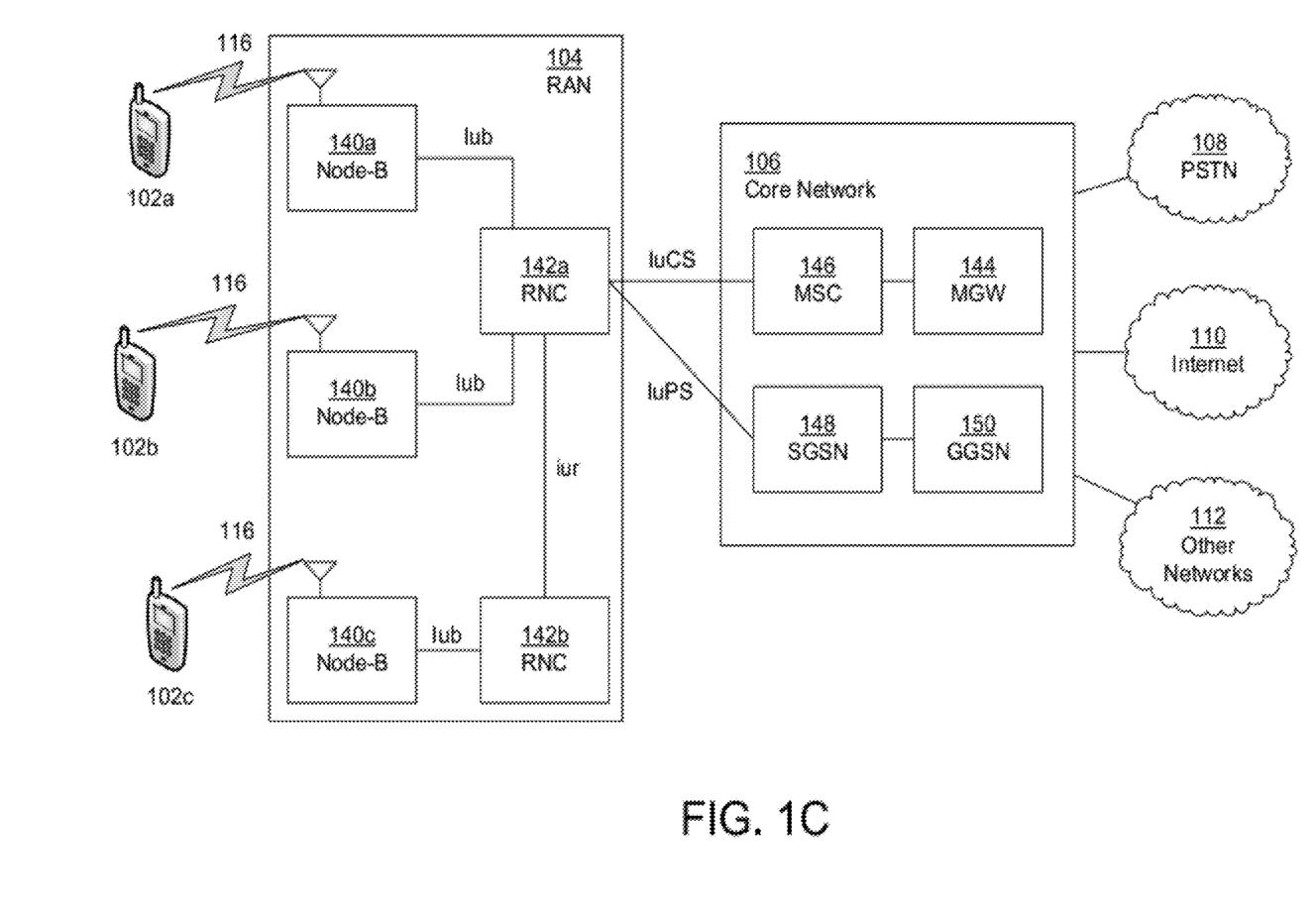
FIG. 1C depicts a system diagram of an example radio access network and an example core network that may be used within the communications system illustrated in FIG. 1A.

FIG. 1C is a system diagram of the RAN 104 and the core network 106a according to an embodiment. As noted above, the RAN 104 may employ a UTRA radio technology to communicate with the WTRUs 102a, 102b, 102c over the air interface 116. The RAN 104 may also be in communication with the core network 106a. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106a shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106a, it will be appreciated that any one of these elements may be owned and/or operated by an entity other than the core network operator.

The RNC 142a in the RAN 104 may be connected to the MSC 146 in the core network 106a via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106a via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106a may also be connected to the networks 112, which may include other wired or wireless networks that are owned and/or operated by other service providers.

Figure 1D:
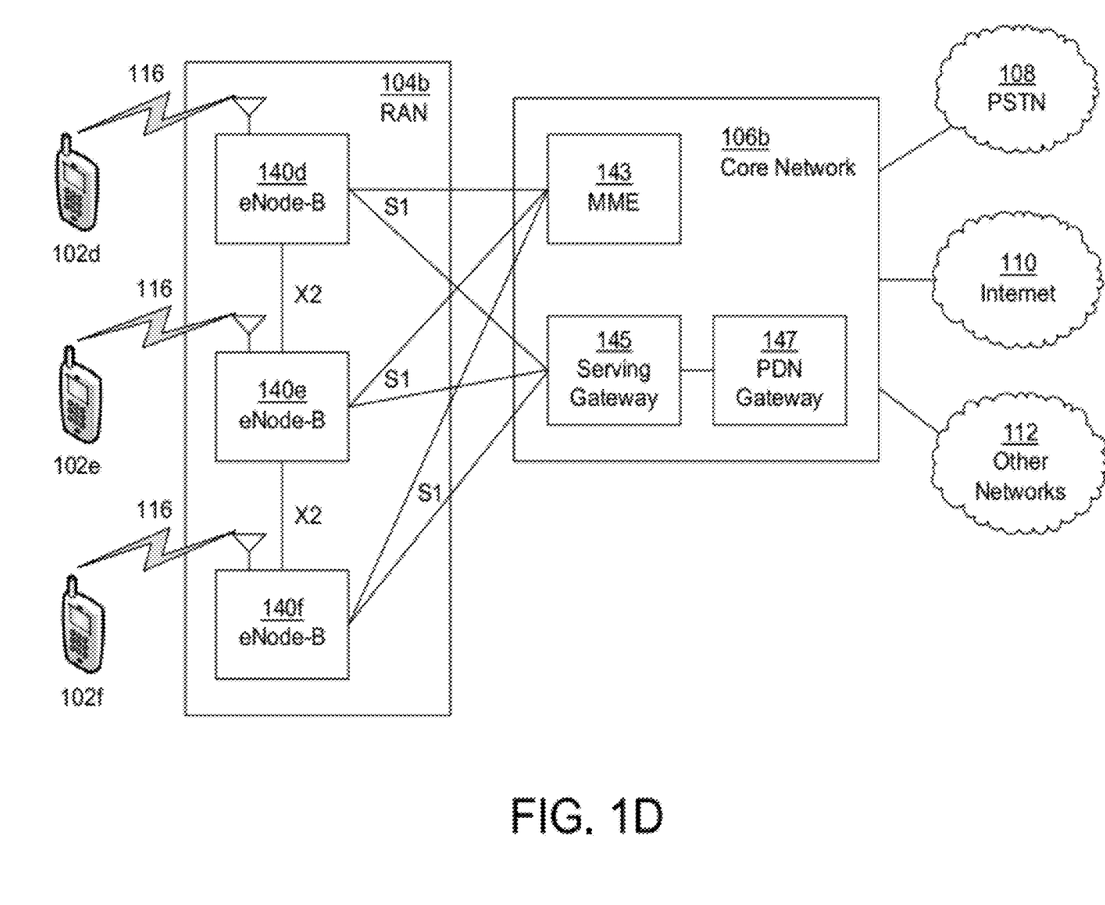
FIG. 1D depicts a system diagram of an example radio access network and an example core network that may be used within the communications system illustrated in FIG. 1A.

FIG. 1D is a system diagram of the RAN 104b and the core network 106b according to an embodiment. As noted above, the RAN 104b may employ an E-UTRA radio technology to communicate with the WTRUs 102d, 102e, 102f over the air interface 116. The RAN 104 may also be in communication with the core network 106b.

The RAN 104 may include eNode-Bs 140d, 140e, 140f, though it will be appreciated that the RAN 104 may include any number of eNode-Bs while remaining consistent with an embodiment. The eNode-Bs 140d, 140e, 140f may each include one or more transceivers for communicating with the WTRUs 102d, 102e, 102f over the air interface 116. In one embodiment, the eNode-Bs 140d, 140e, 140f may implement MIMO technology. Thus, the eNode-B 140d, for example, may use multiple antennas to transmit wireless signals to, and receive wireless signals from, the WTRU 102d.

Each of the eNode-Bs 140d, 140e, 140f may be associated with a particular cell (not shown) and may be configured to handle radio resource management decisions, handover decisions, scheduling of users in the uplink and/or downlink, and the like. As shown in FIG. 1D, the eNode-Bs 140d, 140e, 140f may communicate with one another over an X2 interface.

The core network 106b shown in FIG. 1D may include a mobility management gateway (MME) 143, a serving gateway 145, and a packet data network (PDN) gateway 147. While each of the foregoing elements are depicted as part of the core network 106b, it will be appreciated that any one of these elements may be owned and/or operated by an entity other than the core network operator.

The MME 143 may be connected to each of the eNode-Bs 140d, 140e, 140f in the RAN 104b via an S1 interface and may serve as a control node. For example, the MME 143 may be responsible for authenticating users of the WTRUs 102d, 102e, 102f, bearer activation/deactivation, selecting a particular serving gateway during an initial attach of the WTRUs 102d, 102e, 102f, and the like. The MME 143 may also provide a control plane function for switching between the RAN 104b and other RANs (not shown) that employ other radio technologies, such as GSM or WCDMA.

The serving gateway 145 may be connected to each of the eNode Bs 140d, 140e, 140f in the RAN 104b via the S1 interface. The serving gateway 145 may generally route and forward user data packets to/from the WTRUs 102d, 102e, 102f. The serving gateway 145 may also perform other functions, such as anchoring user planes during inter-eNode B handovers, triggering paging when downlink data is available for the WTRUs 102d, 102e, 102f, managing and storing contexts of the WTRUs 102d, 102e, 102f, and the like.

The serving gateway 145 may also be connected to the PDN gateway 147, which may provide the WTRUs 102d, 102e, 102f with access to packet-switched networks, such as the Internet 110, to facilitate communications between the WTRUs 102d, 102e, 102f and IP-enabled devices.

The core network 106b may facilitate communications with other networks. For example, the core network 106b may provide the WTRUs 102d, 102e, 102f with access to circuit-switched networks, such as the PSTN 108, to facilitate communications between the WTRUs 102d, 102e, 102f and traditional land-line communications devices. For example, the core network 106b may include, or may communicate with, an IP gateway (e.g., an IP multimedia subsystem (IMS) server) that serves as an interface between the core network 106b and the PSTN 108. In addition, the core network 106b may provide the WTRUs 102d, 102e, 102f with access to the networks 112, which may include other wired or wireless networks that are owned and/or operated by other service providers.

Figure 1E:
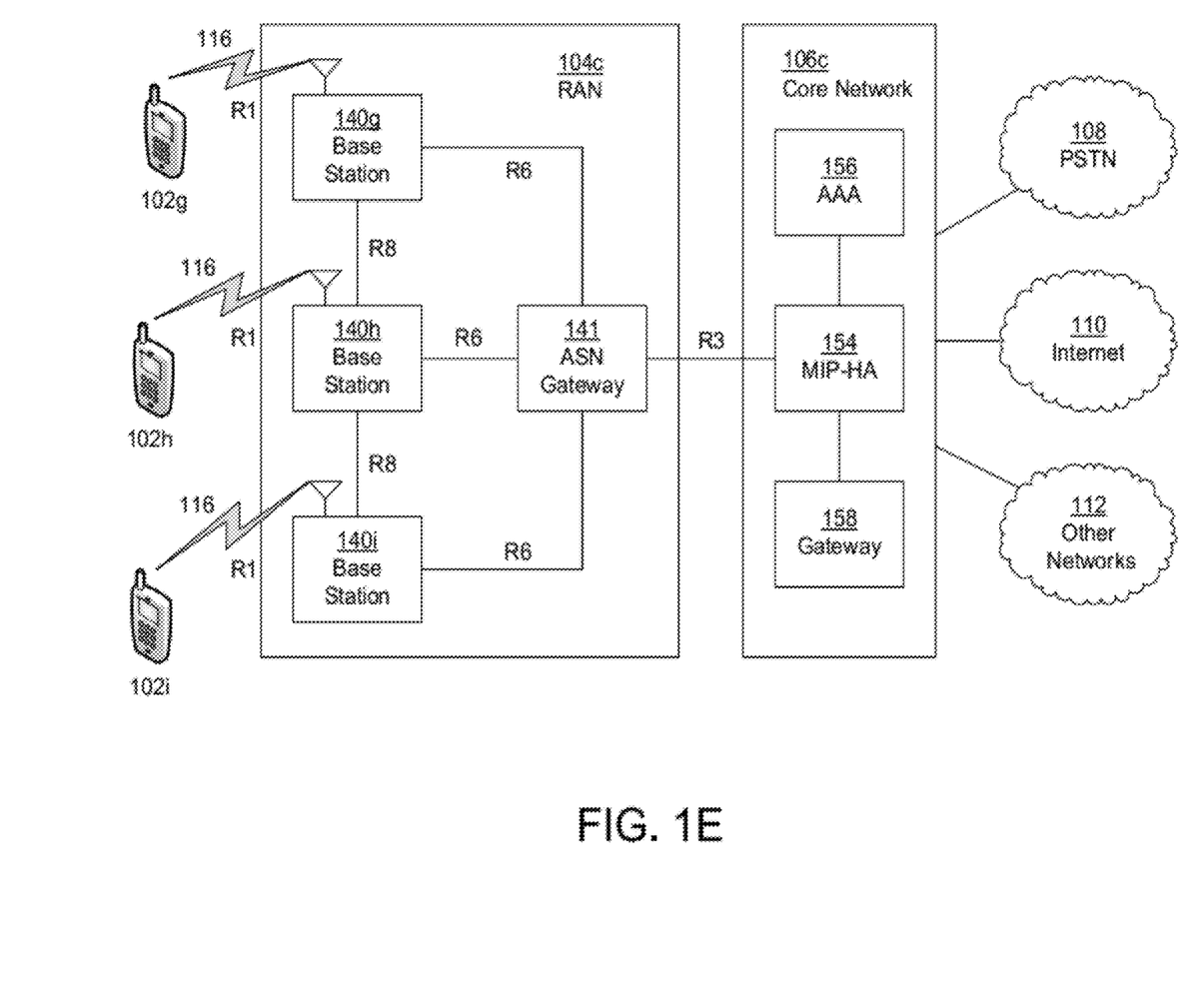
FIG. 1E depicts a system diagram of an example radio access network and an example core network that may be used within the communications system illustrated in FIG. 1A.

FIG. 1E is a system diagram of the RAN 104c and the core network 106c according to an embodiment. The RAN 104c may be an access service network (ASN) that employs IEEE 802.16 radio technology to communicate with the WTRUs 102g, 102h, 102i over the air interface 116. As will be further discussed below, the communication links between the different functional entities of the WTRUs 102g, 102h, 102i, the RAN 104c, and the core network 106c may be defined as reference points.

As shown in FIG. 1E, the RAN 104c may include base stations 140g, 140h, 140i, and an ASN gateway 141, though it will be appreciated that the RAN 104 may include any number of base stations and ASN gateways while remaining consistent with an embodiment. The base stations 140g, 140h, 140i may each be associated with a particular cell (not shown) in the RAN 104c and may each include one or more transceivers for communicating with the WTRUs 102g, 102h, 102i over the air interface 116. In one embodiment, the base stations 140g, 140h, 140i may implement MIMO technology. Thus, the base station 140g, for example, may use multiple antennas to transmit wireless signals to, and receive wireless signals from, the WTRU 102g. The base stations 140g, 140h, 140i may also provide mobility management functions, such as handoff triggering, tunnel establishment, radio resource management, traffic classification, quality of service (QoS) policy enforcement, and the like. The ASN Gateway 141 may serve as a traffic aggregation point and may be responsible for paging, caching of subscriber profiles, routing to the core network 106c, and the like.

The air interface 116 between the WTRUs 102g, 102h, 102i and the RAN 104c may be defined as an R1 reference point that implements the IEEE 802.16 specification. In addition, each of the WTRUs 102g, 102h, 102i may establish a logical interface (not shown) with the core network 106c. The logical interface between the WTRUs 102g, 102h, 102i and the core network 106c may be defined as an R2 reference point, which may be used for authentication, authorization, IP host configuration management, and/or mobility management.

The communication link between each of the base stations 140g, 140h, 140i may be defined as an R8 reference point that includes protocols for facilitating WTRU handovers and the transfer of data between base stations. The communication link between the base stations 140g, 140h, 140i and the ASN gateway 141 may be defined as an R6 reference point. The R6 reference point may include protocols for facilitating mobility management based on mobility events associated with each of the WTRUs 102g, 102h, 100i.

As shown in FIG. 1E, the RAN 104 may be connected to the core network 106c. The communication link between the RAN 104c and the core network 106c may defined as an R3 reference point that includes protocols for facilitating data transfer and mobility management capabilities, for example. The core network 106c may include a mobile IP home agent (MIP-HA) 144, an authentication, authorization, accounting (AAA) server 156, and a gateway 158. While each of the foregoing elements are depicted as part of the core network 106c, it will be appreciated that any one of these elements may be owned and/or operated by an entity other than the core network operator.

The MIP-HA may be responsible for IP address management, and may enable the WTRUs 102g, 102h, 102i to roam between different ASNs and/or different core networks. The MIP-HA 154 may provide the WTRUs 102g, 102h, 102i with access to packet-switched networks, such as the Internet 110, to facilitate communications between the WTRUs 102g, 102h, 102i and IP-enabled devices. The AAA server 156 may be responsible for user authentication and for supporting user services. The gateway 158 may facilitate interworking with other networks. For example, the gateway 158 may provide the WTRUs 102g, 102h, 102i with access to circuit-switched networks, such as the PSTN 108, to facilitate communications between the WTRUs 102g, 102h, 102i and traditional landline communications devices. In addition, the gateway 158 may provide the WTRUs 102g, 102h, 102i with access to the networks 112, which may include other wired or wireless networks that are owned and/or operated by other service providers.

Although not shown in FIG. 1E, it will be appreciated that the RAN 104c may be connected to other ASNs and the core network 106c may be connected to other core networks. The communication link between the RAN 104c the other ASNs may be defined as an R4 reference point, which may include protocols for coordinating the mobility of the WTRUs 102g, 102h, 102i between the RAN 104c and the other ASNs. The communication link between the core network 106c and the other core networks may be defined as an R5 reference, which may include protocols for facilitating interworking between home core networks and visited core networks.

In one example embodiment, interference situations or events may be detected. The UE may use one or more of the techniques described below to detect inter-cell interference to a non-serving cell that may be occurring. After detection of an interference situation or event, the UE may take at least one action as will be described later.

In an example embodiment, interference-indication signals may be used to detect an interference situation. For example, a UE may consider or determine that inter-cell interference may be occurring if the UE receives or detects at least one interference-indication signal transmitted. The interference-indication signal may be transmitted from a serving cell or from a victim cell. The UE may determine that interference may be occurring if the interference-indication indicates that the interference may be above a certain threshold. The interference-indication signal may indicate that a victim cell may be experiencing significant interference from at least one transmission from the UE, such as a transmission on common E-DCH.

An interference-indication signal may be defined by one or more of various characteristics. For example, the signal may be defined by a downlink carrier frequency used to transmit the interference-indication signal. In another example, the interference-indication signal may be defined by a scrambling code that may be used to scramble the interference-indication signal. In another example, the interference-indication signal may be defined by a specific signal from a relative grant channel (E-RGCH), which may be defined by at least one signature sequence and channelization code. In this case the interference-indication signal may be referred to as "E-RGCH" or "common E-RGCH". In another example, the interference-indication signal may be defined by a specific signal from a fractional DPCH (F-DPCH) channel. In another example, the interference-indication signal may be defined by a F-DPCH frame offset, a F-DPCH slot format, and a code number, or the like. In another example, the interference-indication signal may be defined by a specific signal from a newly defined type of physical channel.

In an embodiment, a UE may obtain a set of characteristics for an interference-indication signal applicable to a common E-DCH transmission using one or more of various means. The characteristics for the interference-indication signal may be obtained using the common E-DCH resource currently being used to transmit on a given carrier frequency. For example, the mapping between the specific common E-DCH resource and the characteristics of the corresponding interference-indication signal (or a subset thereof) may be provided by higher layer signaling. Alternatively, the characteristics of the interference-indication signal may be independent of the common E-DCH resource used by the UE. This may allow multiple UEs from multiple cells to use a common interference-indication signal.

The UE may obtain a set of characteristics for an interference-indication signal using the carrier frequency used to transmit the interference-indication signal. For example, the downlink carrier frequency of the interference-indication signal may correspond to the downlink carrier linked to the uplink carrier of the corresponding common E-DCH transmission.

The UE may obtain a set of characteristics for an interference-indication signal using the identity of the victim cell that may be transmitting the interference-indication signal. For example, the interference-indication signal may be scrambled using the primary scrambling code of the victim cell, and be transmitted over the same downlink carrier frequency. In another example, the characteristics may be obtained using the specific channelization code and signature sequence that may be used by the interfere-indication signal may be specific to the victim cell. In another example embodiment, the characteristics may be obtained using the mapping between the specific victim cell and the characteristics of the corresponding interference-indication signal (or a subset thereof) may be provided by higher layer signaling (see the examples set forth below).

The UE may obtain a set of characteristics for an interference-indication signal using higher layer signaling provided through system information of a serving cell. For example, the confirmation information may be broadcast in the system information for each common E-DCH resource and may include specific configuration for interference-indication signals in neighboring victim cells.

The UE may obtain a set of characteristics for an interference-indication signal using higher layer signaling provided through system information of the victim cell(s).

The UE may obtain a set of characteristics for an interference-indication signal using higher layer signaling provided in a dedicated manner, such as in a Cell Update Confirm message.

The UE may also be provided with the characteristics of a common pilot channel (CPICH) using one of the methods described herein. This may be done, for example, to assist the decoding of the interference-indication signal.

Additionally, the UE may determine a threshold that may control the applicability or usability of the interference-indication signal. For example, the UE may determine a threshold and may apply the interference-indication signal when the threshold is surpassed. The threshold may indicate a minimum signal level or quality of the CPICH of the cell transmitting the interference indication signal or of the interference indication signal itself. The threshold may be a value that may be predetermined by higher layers. The threshold may also be based on a received signal level (RSCP) or quality (Ec/Io) of the CPICH of the serving cell that may be optionally added to an offset pre-determined or signaled by higher layers. In another example, the threshold may be based on the received signal level (RSCP) or quality (Ec/Io) of the CPICH of the victim cell indicated by the interference-indication signal, optionally added to an offset pre-determined or signaled by higher layers. The threshold may also be based on the relative difference in received signal level (RSCP) or quality (Ec/Io) of the CPICH between the serving cell and the victim cell. The RSCP or Ec/Io may be added to an offset pre-determined or signaled by higher layers. For instance, the UE may determine that the interference-indication signal from a victim cell may become applicable if the victim cell triggers an event. The event may be similar to event 1A, where the CPICH received signal power or quality may become higher than that of the CPICH of the serving cell, minus an offset and optionally a hysteresis, for a minimum duration (time to trigger) where the offset, hysteresis and time to trigger may be provided by higher layers. The UE may determine that the interference-indication signal from a victim cell may no longer be applicable if the victim cell triggers an event. The event may be similar to event 1B, where the CPICH received signal power or quality becomes lower than that of the CPICH of the serving cell, minus an offset and possibly minus a hysteresis, possibly for a minimum duration (time to trigger).

Any threshold test may be based or applied to a parameter derived from the UE transmission power. For example, a combination of the received signal level (RSCP) or quality (Ec/Io) of the CPICH of the serving cell, the received signal level (RSCP) or quality (Ec/Io) of the CPICH of the victim cell and/or the relative difference between these values may be used for the threshold. The threshold test may be based on UE transmission power. The UE may consider whether its transmission power may be above a certain threshold. The UE may consider its UPH may be below a certain threshold. The UE may consider whether the transmission power for a subset of channels, such as DPCCH, HS-DPCCH, E-DPCCH, or the like may be above a threshold.

The UE may obtain the set of victim cells that may potentially be transmitting the interference-indication signal. The set of victim cells may be obtained by obtaining the list of victim cells from higher layer signaling provided through system information of the serving cell. For instance, the UE may determine that a cell is a victim cell if it is listed in System Information Block 11, and possibly only if a Boolean indication indicates that it should be included in the list of victim cells. Alternatively, the list of victim cells may be provided in a dedicated manner. For example, the list of victim cells may be provided within a Cell Update Confirm or a Radio Bearer Setup or Reconfiguration message. The set of victim cells may be obtained by measuring a signal from a neighbor cell and determining whether the measurement may be above a threshold. The threshold may include, for example, one or more of a value; a measurement, such as CPICH RSCP, CPICH, or Ec/Io, from the serving cell, added (in dB units) to an offset; the relative difference between measurements from the serving cell and potential victim cell; and the like.

The set of neighbor cells that may be measured, as well as corresponding values for the thresholds or offsets, may be obtained through higher layer signaling. A subset of neighbor cells may also be obtained through autonomous detection of its presence by the UE. The measurement may include CPICH RSCP, CPICH, Ec/Io, or the like of the neighbor cell.

The size of the set of victim cells that the UE may monitor for an interference-indication signal may be constrained. For example, the UE may select the two closest neighboring victim cells based on RF measurements using, for example, the mechanisms described herein. The set size may be pre-defined or configured through higher layer signaling.

The UE may also use a number of techniques to detect potential or actual inter-cell interference. For example, a UE may measure a signal (such as the CPICH) transmitted from a neighbor cell and may determine that inter-cell interference may occur if a signal level (RSCP) or quality (Ec/Io) of this measurement is above a threshold. The threshold may include, for example a value; a signal level or quality (RSCP or Ec/Io) of the CPICH of the serving cell, added to an offset; a received signal level (RSCP) of the serving cell; a quality (Ec/Io) of the CPICH of the serving cell; a signal level (RSCP) of the victim cell; a quality (Ec/Io) of the CPICH of the victim cell; or the like. The threshold may also include a relative difference values, such as a relative difference between a RSCP and an Ec/Io for a serving cell or for a victim cell. The threshold may also include a combination of any of the factors discussed herein.

If the signal quality of the serving cell falls below a threshold, the UE may obtain a set of neighborhood cells that may be measured as well as corresponding thresholds or offsets for the neighborhood cells. The set of neighborhood cells and corresponding thresholds may be obtained, for example, through higher layer signaling. A subset of neighbor cells may also be obtained through autonomous detection of its presence by the UE. The measurement may include one or more of CPICH RSCP or CPICH Ec/Io of the neighbor cell.

The UE may also detect potential or actual inter-cell interference by measuring signals being transmitted from a serving cell. For example, the UE may measure signals being transmitted from a serving cell and may determine if those measurements are below a threshold. For example, the UE may measure whether the signal level or quality is below a threshold. When the measurements are below a threshold, the UE may determine that inter-cell interference may be occurring. The threshold may include, for example, the signal level or quality (RSCP or Ec/Io) of the CPICH of the serving cell, added (in dB units) to an offset.

The UE may also detect potential or actual inter-cell interference by determining that inter-cell interference may occur based on cell reselection criteria. For example, the UE may determine that inter-cell interference may occur if it determines, based on signal strength and/or quality measurements, that the cell reselection criterion may be met for at least one neighbor cell operating on at least one frequency which the UE may be operating on, in the uplink. In another example, the UE may determine that inter-cell interference may occur if it determines that the cell reselection criterion may be met for at least one neighbor cell operating on the primary or serving frequency in the downlink. In another example, the UE may determine that inter-cell interference may occur if it determines, based on signal strength and/or quality measurements, that the cell reselection criterion may be met for at least one neighbor cell operating on a different frequency.

The UE may also detect potential or actual inter-cell interference by determining if a condition occurs. The condition may be that the total transmission power for the UE may be above a threshold, that the transmission power for a subset of channels (such as DPCCH, HS-DPCCH, E-DPCCH) may be above a threshold, that the UE power headroom (UPH) is below a threshold, that the ratio of maximum power to DPCCH power may be below a threshold, or the like. The UE may also detect potential or actual inter-cell interference by determining if a combination of conditions occur.

The threshold (or set of thresholds) may be provided by higher layer signaling, for instance through system information of the serving cell, or from dedicated signaling (Cell Update Confirm).

The UE may be required to monitor the criteria described above for a set of multiple neighboring victim cells. The size of the set of victim cells may be constrained to be of a certain maximum size. For example, the UE may select only the two closest neighboring victim cells based on RF measurements, such as RF measurements described herein. The maximum set size may be pre-defined or configured through higher layer signaling.

Described below are additional criteria that a UE may use to determine whether it may take action to reduce inter-cell interference.

The UE may detect and/or reduce interference based on the UL logical channel that triggered the request for UL transmission over common E-DCH. For example, if the common E-DCH channel was originated for the transfer of DCCH or DTCH traffic. For CCCH traffic, the UE may not attempt reducing inter-cell interference.

The UE may detect and/or reduce interference based on the RNTI or cell specific address allocation. For example, the UE may detect and reduce interference if the UE has been allocated a valid E-RNTI in the cell that it is transmitting the common E-DCH. If the UE does not have a valid E-RNTI, e.g., following cell reselection or upon RRC Connection Request, the UE may not attempt to reduce inter-cell interference.

The UE may detect and/or reduce interference based on the remaining UL buffer occupancy. For example, the UE may be required to take action upon detection of interference situation if the remaining UL buffer occupancy may be above a threshold.

The UE may detect and/or reduce interference based on the state of contention resolution. For example, the UE may wait until the contention resolution phase that takes places at the start of a common E-DCH access completes before attempting to detect and/or reduce interference. Prior to completion of the contention resolution phase, the UE may not reduce inter-cell interference.

The UE may detect and/or reduce interference based on the amount of time that the UE has been transmitting using the common E-DCH. For example, the UE may detect and/or reduce interference using the methods described herein after the common E-DCH allocation extends beyond a period of time. The period of time may be measured in absolute time, in number of TTIs, number of system frames, or the like.

Upon detection of an actual or potential inter-cell interference situation, the UE may attempt to reduce power using one or more of the methods described below. The UE may perform these methods on the on the frequency that inter-cell interference may occur.

Upon detection of an actual or potential inter-cell interference, a UE may reduce its grant, or maximum E-DPDCH power, by a certain value (in dB). This reduction may take place according to a mechanism similar to the reduction that takes place when the UE receives a "down" command from a relative grant channel, for example if the interference indication signal has the same structure as an E-RGCH channel ("common E-RGCH"). The amount of reduction may be obtained using a higher-layer signaling, a codepoint signaled from the interference-indication signal, or a combination of the two.

A UE may monitor an E-DCH relative grant value to detect and/or reduce interference. For example, a UE may monitor E-DCH relative grant channels transmitted from a set of victim cells. The set of victim cells may be determined using the methods described herein. Upon detection of an E-DCH relative grant value set to "−1" from one of the victim Node Bs, the UE may reduce its serving grant as will be understood.

A UE may stop transmitting on E-DPDCH (i.e. uses a zero grant) to reduce or prevent interference. This may occur if the grant is below a threshold prior to the detection of the inter-cell interference condition. The UE may also stop transmission of the E-DPCCH.

The UE may deactivates the HARQ process that may have been used in a previous transmission to prevent or reduce interference. This may occur if the grant was below a threshold prior to the detection of the inter-cell interference condition. The timing relationship between the de-activated HARQ process and the detection of the interference condition (especially in case of an interference-indication signal) may be pre-defined.

A UE may reduce the transmission power of its DPCCH channel to reduce and/or prevent interference. This may be done when an interference event may be present. This may occurs if the UE may be using a zero grant, or if a subset or all HARQ processes may be de-activated. The UE may consistently adjust the E-DPCCH and/or HS-DPCCH transmission power given that the level of these channels may be normally defined as an offset to the DPCCH. The amount of reduction may be obtained using higher-layer signaling or from a codepoint signaled from the interference-indication signal.

A UE may monitor an F-DPCH channel in one or a set of victim neighboring Node Bs, according to the criteria described herein to detect and/or prevent interference. Upon detection of a command to reduce its transmission power, the UE may apply the reduction of transmission power on the DPCCH channel. The procedure for reduction of transmission power may be similar to that as described for CELL_DCH.

A UE may apply power scaling to one, a group or all UL channels upon detection of the interference situation. This may be done, for example, to prevent or reduce interference. The UE may apply a similar power scaling solution that may be used in CELL_DCH.

To prevent interference, a UE may release resources for uplink transmission. Such resources may include resources allocated for transmission on common E-DCH (which may include DPCCH and HS-DPCCH, resources allocated for transmission on E-DPCCH and E-DPDCH, resources allocated for transmission on DPCCH and HS-DPCCH, a combination of these factors, or the like. For example, resources allocated for transmission on DPCCH and HS-DPCCH if the UE may not have been allocated E-DCH-specific resources and if the TEBS may be zero. A UE may also perform cell reselection and a cell update procedure. In case the interference indication signal has the same structure as a E-RGCH channel, such release of resources may occur if following the reception of a "Down" signal from this E-RGCH, the grant falls below a minimum threshold.

A UE may send an indication to the network to indicate that a 1 inter-cell interference condition or potential condition may exist. Such an indication may include, for example, a MAC-layer indication, such as a Scheduling Information (SI). In case a Scheduling Information may have been transmitted, a codepoint may be defined or re-defined to represent the indication of interference. In the case where the UE may have determined that it may release the common E-DCH resource, the MAC-layer indication may be the same indication that used to indicate to the RAN that the UE may release the common E-DCH resources.

An RRC-layer indication, such as a Measurement Report may be used to send an indication to the network that an inter-cell interference condition may exist. The measurement report may contain the measurement results from a victim neighbor cell, a neighbor cell, or a combination of a victim cell and neighbor cells.

Another example indication may include an indication (MAC or RRC) transmitted upon expiration of a timer started upon detection of the actual or potential interference situation according to one of the triggers described herein above. Another example indication may include an indication (MAC or RRC) re-transmitted upon expiration of a timer started upon transmission of a previous indication, if the conditions for detection potential or actual interference situation are still satisfied upon expiration of the timer. Optionally, the timer may be stopped when the condition(s) for detection of potential or actual interference situation is not met anymore.

The network may assist the UE in the cell reselection and cell update procedures by pre-allocating a set of common E-DCH resources in a target cell that may allow for contention-free access in the new cell. By way of example, the source or current serving Node B may send a command to the UE to move to a new cell and resume transmission in the new cell using a specific common E-DCH resource. The command may be sent by the RAN using any suitable technique, such as, by use of a L1 signal, such as an HS-SCCH order, for example. The HS-SCCH order may include an index to a common E-DCH resource set that the UE shall use in the new cell. In another example, the command may be sent through RRC signaling. An existing or new RRC message may be used to pre-allocate resources in the new cell, including an E-RNTI and a common E-DCH resource set.

In one example embodiment, a method may be used for detecting inter-cell interference when a UE is in a non-DCH state. A set of characteristics for an interference indication signal applicable to a common enhanced dedicated cannel (E-DCH) resource may be obtained. An interference indication from a relative grant channel (E-RGCH) using the set of characteristics of the interference indication signal may be determined. The interference indication may indicate that a victim cell is experiencing inter-cell interference. A threshold to apply the interference indication may be determined. The interference indication may be applied when the threshold is met or exceeded.

A set of characteristics may be obtained by receiving a mapping between the common E-DCH resource and the set of characteristics of the interference indication signal from a higher layer. For example, the set of characteristics of the interference indication signal may be received from a common E-DCH resource. The set of characteristics of the interference indication signal consists of a signature sequence and a channelization code. A mapping may then be used to determine the set of characteristics of the interference indication signal.

A condition to apply the interference indication may be determined by determining a signal level or quality that a signal transmitting the interference indication should meet or exceed. The threshold may also be determined by determining a signal level or quality that a signal transmitted from a victim cell indicated by the interference indication should meet or exceed.

In another example embodiment, a method may be used to control inter-cell interference when a UE is in a non-dedicated channel (DCH) state. It may be determined that inter-cell interference may be affecting a victim cell from a relative grant channel (E-RGCH) using a set of characteristics. A threshold that indicates when to control the inter-cell interference may be determined. Inter-cell interference may be controlled when the threshold is met or exceeded.

To determining that inter-cell interference may be affected by a victim cell, a mapping between at least one common E-DCH resource and at least one set of characteristics for an interference indication signal may be received from a higher layer. An interference indication may be selected from the mapping using the at least one set of characteristics for an interference indication signal. The victim cell may be determined using the selected interference indication.

Inter-cell interference that may be affecting a victim cell may be determined. Characteristics of an interference indication signal may be received from a common E-DCH resource. The interference indication may be determined using the characteristics of an interference indication signal, the interference indication identifying the victim cell.

Inter-cell interference may be controlled by reducing grant or maximum enhanced dedicated physical data channel (E-DPDCH) power, ceasing to transmit on E-DPDCH, or deactivating a hybrid automatic repeat request (HARD) process that was used in a previous transmission.

Figure 2:
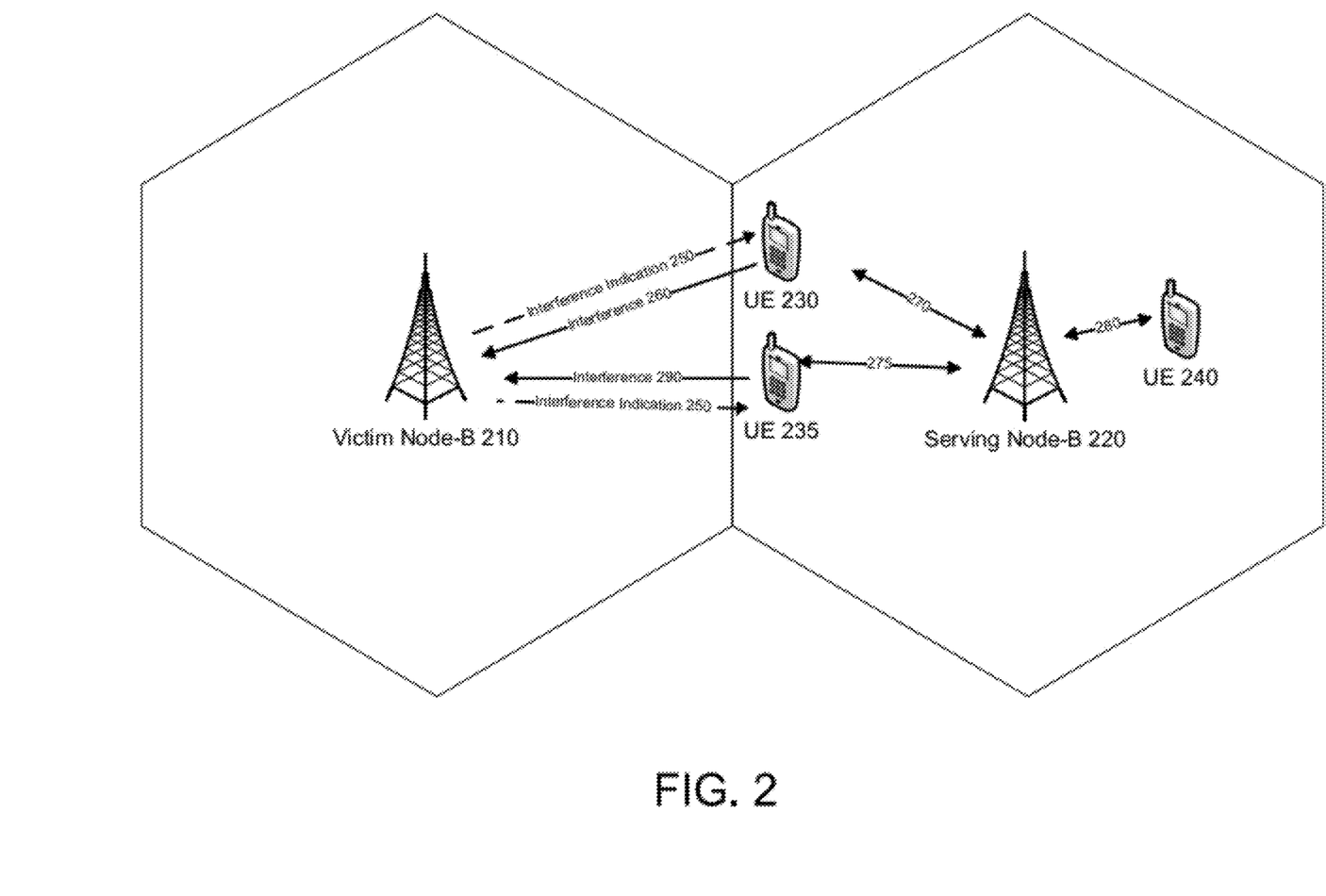
FIG. 2 depicts a system diagram for detecting and/or controlling inter-cell interference when a UE is in a non-DCH state.

FIG. 2 depicts a system diagram for detecting and/or controlling inter-cell interference when a UE is in a non-DCH state. For example, the system may be used to overcome inter-cell interference and allow a more extensive utilization of the Cell_FACH state.

As shown in FIG. 2, common E-DCH resources may be assigned from serving Node-B 220. For example, UE 230, UE 235, and UE 240 may be assigned common E-DCH resources from serving cell 220. This may allow UE 230 to communicate with serving Node-B 220 via 270 and may allow UE 240 to communicate with serving Node-B 220 via 280.

Since common E-DCH resources may be assigned from serving Node-B 220, uplink macro-diversity may not be possible between neighboring Node B's, such as Victim Node-B 210. In addition, UEs assigned a common E-DCH resource, such as UE 230, UE 235, and UE 240 may not be allowed to perform cell reselection.

A UE may generate inter-cell interference by maintaining an assignment of a common E-DCH resource Victim Node-B may be a non-serving Node B and may be experience or may potentially experience inter-cell interference. For example, as a UE moves closer to a neighboring cell controlled by victim Node-B 210, transmission made to serving node-B using the common E-DCH resource may cause interference with victim Node-B 210. As shown in FIG. 2, UE 235 may transmit interference 260 to victim Node-B 210 and UE 230 may transmit interference 260 to victim Node-B 210. Interference 290 may be transmitted using the common E-DCH resources UE 230 uses to communicate with serving Node-B 220 via 270. Interference 290 may be transmitted using the common E-DCH resources UE 235 uses to communicate with serving Node-B 220 via 275.

To prevent or control the inter-cell interference, a UE and/or the victim Node-B may detect an interference situation or a potential interference situation. For example, victim Node-B 210, UE 230, and/or UE 235 may detect that victim Node-B 210 is being affected by interference 290 and interference 260. Upon the detection of the interference situation or the potential interference situation, victim Node-B 210 may transmit an interference indication, such as interference indication 250. Victim Node-B 210 may transmit an interference indication to one or more UEs. For example, victim node-B 210 may transmit the interference indication 250 to UE 230 and/or UE 235. The interference indication may identify the victim Node-B and may notify a UE that the victim Node-B experience an interference situation. The interference indication, such as interference indication 250, may be defined by one or more characteristics as described above. For example, the interference indication may be defined by a downlink carrier frequency used to transmit the interference indication.

Upon receiving an interference indication, a UE may act to control or prevent the interference situation or potential interference situation as described above. For example, upon receiving interference indication 250, UE 230 and/or UE 235 may reduce its grant or maximum E-DPDCH power.

Figure 3:
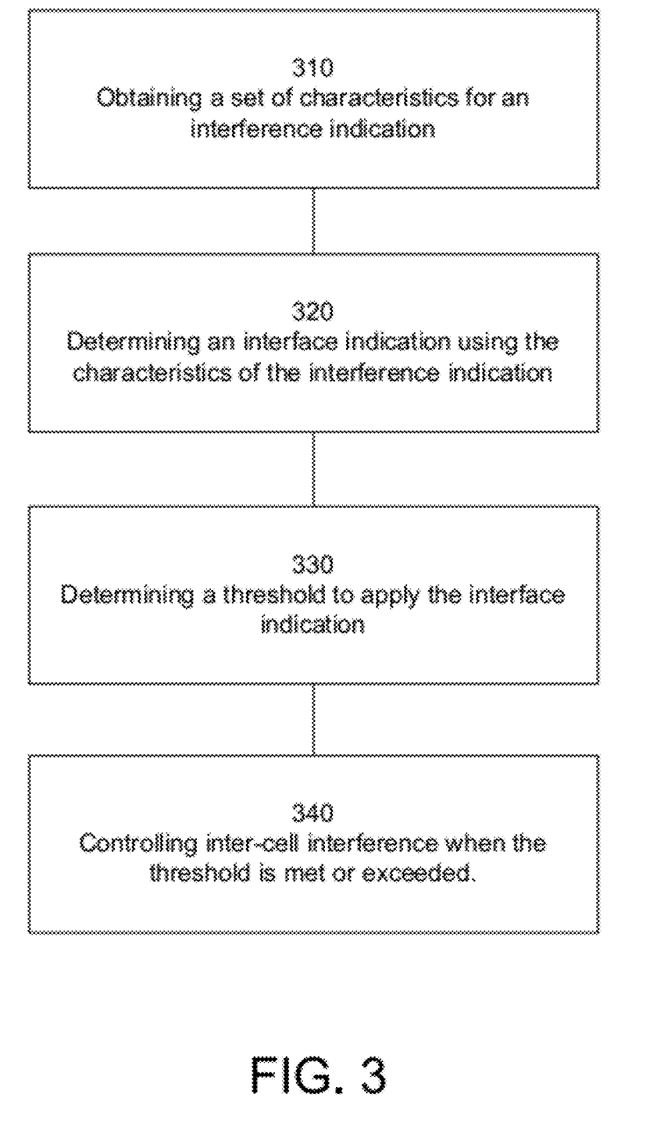
FIG. 3 depicts a flow diagram of a method for detecting and/or controlling inter-cell interference when a UE is in a non-DCH state.

FIG. 3 depicts a flow diagram of a method for detecting and/or controlling inter-cell interference when a UE is in a non-DCH state. This may be done, for example, to overcome inter-cell interference and allow a more extensive utilization of the Cell_FACH state.

At 310, a set of characteristics for an interference indication applicable to a common enhanced dedicated cannel (E-DCH) resource may be obtained. The characteristics of the interference indication may include of a signature sequence and a channelization code. The set of characteristics may be obtained using any of the methods described above. For example, a mapping between the common E-DCH resource and the characteristics of the interference indication from a higher layer may be received. The mapping may be used to determine the characteristics of the interference indication. As another example, the set of characteristics may be obtained by receiving the characteristics of the interference indication from the common E-DCH resource.

At 320, an interference indication from a relative grant channel (E-RGCH) may be determined using the characteristics of the interference indication. The interference indication may indicate that a victim cell may be experiencing inter-cell interference. The interference indication may be determined according to any of the methods described above. For example, the interference indication may be determined by selecting an interference indication from a mapping using a set of characteristics for an interference indication. A victim cell may then be determined using the selected interference indication.

At 330, a threshold to apply the interference indication may be determined. The threshold may be determined according to any of the methods described above. For example, the threshold may be determined by a signal level or quality that a signal transmitted from a victim cell indicated by the interference indication should meet or exceed.

At 330, the interference indication may be applied when the threshold is met or exceeded. The interference indication may be applied using any of the methods described above. For example, the interference indication may be applied by controlling inter-cell interference comprises reducing grant or maximum enhanced dedicated physical data channel (E-DPDCH) power. As another example, the interference indication may be applied by controlling inter-cell interference comprises ceasing to transmit on E-DPDCH. The interference indication may be applied by controlling inter-cell interference comprises deactivating a hybrid automatic repeat request (HARM) process that was used in a previous transmission.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for adjusting a transmission power of a wireless transmit/receive unit (WTRU) on an enhanced relative grant channel (E-RGCH) for inter-cell interference, the method comprising:
   measuring a serving cell channel quality for the WTRU and at least one neighbor cell channel quality for the WTRU;
   comparing, in the WTRU, the at least one neighbor cell channel quality with the serving cell channel quality;
   adding, in the WTRU, the at least one neighbor cell to a list of monitored cells, if for a time to trigger, the difference between the at least one neighbor cell channel quality and the serving cell channel quality exceeds a hysteresis threshold;
   monitoring, at the WTRU, the E-RGCH for each cell in the list of monitored cells; and
   adjusting the WTRU transmission power for commands on the E-RGCH for the monitored cells.

2. The method of claim 1, further comprising determining a cell offset for each cell in the list of monitored cells.

3. The method of claim 2, wherein adjusting the WTRU transmission power for commands on the E-RGCH for the monitored cells comprises using the cell offset for each cell.

4. The method of claim 1, wherein the hysteresis threshold comprises a signal quality of the serving cell added to an offset.

5. A wireless/transmit receive unit (WTRU) that adjusts a transmission power of the wireless transmit/receive unit (WTRU) on an enhanced relative grant channel (E-RGCH) for inter-cell interference, the WTRU comprising:
   a processor configured to:
      measure a serving cell channel quality for the WTRU and at least one neighbor cell channel quality for the WTRU;
      compare, in the WTRU, the at least one neighbor cell channel quality with the serving cell channel quality;
      add, in the WTRU, the at least one neighbor cell to a list of monitored cells, if for a time to trigger, the difference between the at least one neighbor cell channel quality and the serving cell channel quality exceeds a hysteresis threshold;
      monitor, at the WTRU, the E-RGCH for each cell in the list of monitored cells; and
      adjust the WTRU transmission power for commands on the E-RGCH for the monitored cells.

6. The WTRU of claim 5, wherein the processor is further configured to determine a cell offset for each cell in the list of monitored cells.

7. The WTRU of claim 6, wherein the processor is configured to adjust the WTRU transmission power for commands on the E-RGCH for the monitored cells by using the cell offset for each cell.

8. The WTRU of claim 6, wherein the hysteresis threshold comprises the signal quality of the serving cell added to an offset.

* * * * *